United States Patent
Kwong et al.

(10) Patent No.: US 8,212,183 B2
(45) Date of Patent: Jul. 3, 2012

(54) METHOD AND APPARATUS FOR UTILIZING THERMAL ENERGY GENERATED BY MEDICAL DIAGNOSTIC DEVICES

(75) Inventors: Wah Yiu Kwong, Beaverton, OR (US); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1228 days.

(21) Appl. No.: 11/644,992

(22) Filed: Dec. 26, 2006

(65) Prior Publication Data

US 2008/0154159 A1 Jun. 26, 2008

(51) Int. Cl.
*H05K 7/20* (2006.01)
*F28F 23/00* (2006.01)
*F28F 27/00* (2006.01)

(52) U.S. Cl. ........ 219/201; 219/209; 219/385; 165/277; 165/96; 165/185; 361/704; 361/714; 361/717

(58) Field of Classification Search .......................... None
See application file for complete search history.

(56) References Cited

U.S. PATENT DOCUMENTS

| | | | | |
|---|---|---|---|---|
| 4,007,806 A | * | 2/1977 | Nobles, Jr. ................... | 181/131 |
| 4,296,752 A | * | 10/1981 | Welsh et al. ................. | 600/358 |
| 4,568,281 A | * | 2/1986 | Harvey et al. ................. | 433/30 |
| 5,078,151 A | * | 1/1992 | Laballery ..................... | 600/528 |
| 6,396,931 B1 | * | 5/2002 | Malilay ........................ | 381/67 |
| 6,686,569 B2 | * | 2/2004 | Li ................................... | 219/433 |
| 6,790,178 B1 | * | 9/2004 | Mault et al. .................. | 600/300 |
| 7,312,425 B2 | * | 12/2007 | DeCobert et al. ............ | 219/433 |
| RE40,116 E | * | 2/2008 | Engstrom ..................... | 455/66.1 |
| 7,402,776 B2 | * | 7/2008 | Smith et al. .................. | 219/209 |
| 2002/0064024 A1 | * | 5/2002 | McCullough et al. ........ | 361/687 |
| 2005/0111194 A1 | * | 5/2005 | Sohn ............................ | 361/704 |
| 2006/0191894 A1 | * | 8/2006 | Usui et al. ................... | 219/466.1 |
| 2007/0055171 A1 | * | 3/2007 | Fraden ......................... | 600/549 |
| 2007/0232923 A1 | * | 10/2007 | Asuri ............................ | 600/459 |
| 2007/0282208 A1 | * | 12/2007 | Jacobs et al. ................ | 600/485 |
| 2008/0058644 A1 | * | 3/2008 | Sandrin et al. ............... | 600/438 |
| 2008/0228095 A1 | * | 9/2008 | Richardson .................. | 600/528 |
| 2008/0273709 A1 | * | 11/2008 | Thiagarajan et al. .......... | 381/67 |

FOREIGN PATENT DOCUMENTS

| | | | | |
|---|---|---|---|---|
| JP | 2001230578 A | * | 8/2001 | |
| JP | 2002076217 A | * | 3/2002 | |

* cited by examiner

*Primary Examiner* — Joseph M Pelham
(74) *Attorney, Agent, or Firm* — Raj S. Dave; Pillsbury Winthrop Shaw Pittman LLP

(57) ABSTRACT

This invention relates to the use of system thermal energy generated by equipment, such as an ultrasound sensing device, to transfer heat to the peripherals/sensors/probes under user control. This is accomplished by recycling the heat generated by the system and used that to keep the peripheral/sensor/probe warm.

17 Claims, 1 Drawing Sheet

METHOD AND APPARATUS FOR UTILIZING THERMAL ENERGY GENERATED BY MEDICAL DIAGNOSTIC DEVICES

FIELD OF INVENTION

The invention relates to a method of control and transfer of heat for medical peripherals.

BACKGROUND

There are heating elements in the market incorporated into systems for warming medical peripherals. However, those heating elements are powered by battery/electricity and impact the system's battery life. For example, to meet the needs of the most demanding heating applications, a comprehensive custom heating pad design and manufacturing service is offered by electro-mechanical thermal management specialist ACAL Radiatron™. The capability has been further expanded with the introduction of high power density printed-element heater pads operating at temperatures up to 650° C. and 'smart' self-regulating heater mats for lower temperatures.

Other examples include, using flexible portfolios of material and manufacturing technology options, fabricating heating pads to custom specifications ensuring best-in-class thermal performance as cost-effectively as possible. A joint-development approach to achieve optimum design solutions often brings value-added benefits due to a company's wide-ranging capability coupled with extensive and proven expertise. This philosophy repeatedly delivers the right product with the right price at the right time.

New applications continue to emerge every day. Typically, pads, mats and heating elements are used for surface heating in food processing, catering/medical equipment and similarly diverse applications. In outdoor cold-weather applications, the pads are used in areas such as condensation protection in system enclosures of all kinds, from telecoms base-stations to point-of-sale and remote systems requiring stable operating temperatures. As equipment generally becomes smaller and more compact, and as power consumption issues concern designers, the pads are proving increasingly popular as wafer-thin space-saving alternative to cumbersome air-conditioning units, for example.

The pads can be produced in virtually any shape or form and may be flexible or rigid depending on end-user needs. With extremely low thermal mass, they can be designed to offer fast-acting or steady heat-flow evenly distributed right across the pad surface avoiding excessive thermal gradients, cold spots or can be zoned into selective areas. To achieve this, the company can exploit a range of separate element technologies and dielectric materials. These include fixed resistance etched foils, resistive wire or variable resistance conductive inks and alloys depending on power density, size and volume requirements. Printed directly onto steel or ceramic gives the lowest mass and high temperature performance. Other dielectrics include silicone rubber (to 260° C.), polyimide (Kapton) (to 200° C.), polyester (to 120° C.). They are typically supplied with connection wiring to suit individual needs and are subsequently temperature controlled by switching circuitry such as bi-metal thermostats or solid-state NTC's.

In addition, self-regulating heat pads are offered which change their resistance in proportion to the surrounding ambient temperature—so the colder it becomes the harder the heater works. They are manufactured using a specialized PTC polymer printed ink element which features interleaved bus bar technology to produce multiple parallel circuits across its surface. Ideal for lower temperature start up, anti-condensation or defrost requirements—examples include self-governing automotive, scientific and industrial heating requirements. The pads respond quickly to ambient temperature variations to cost-effectively maintain an optimized and regular operating temperature, typically from −60° C. to 70° C.

Notably absent from the prior art, as well, are devices that are suitable for medical professionals to use to gather and store physical data from patients—vital signs, photographs, etc. and store the data in a convenient, tablet-style device. Such devices should offer wireless data acquisition, data storage, and the processor capacity to run a powerful, flexible operating system in a durable, ergonomic form factor capable of withstanding exposure to liquids and other environmental factors. To accommodate the needed processing power, the device should also be capable of dissipating the heat generated by modern central processing units without causing discomfort to the user or requiring a chassis having large, inconvenient heat sinks or vents that might permit the device to be contaminated or damaged by liquids or high-humidity environments.

DETAILED DESCRIPTION

Figure 1A:
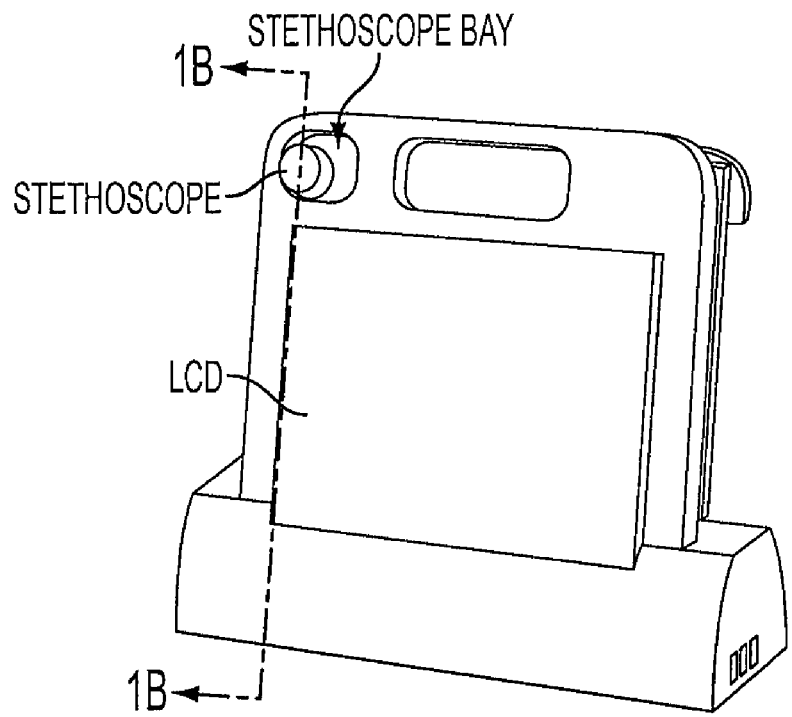
FIG. 1A and FIG. 1B illustrate an exemplary medical peripheral with an embedded heating element and temperature control in accordance with one embodiment of the invention.

In one embodiment of the invention, there is an apparatus, including an embedded heating element to warm an exterior portion of the apparatus, wherein the heating element is heated using thermal energy generated by the apparatus. The apparatus further includes a user temperature preference control to set a level of comfort at the exterior portion of the apparatus. In one aspect, the exterior portion of the apparatus is one of a sensor and probe. The apparatus also includes a heat transfer element and a device to generate the thermal energy, wherein the thermal energy is transferred to the heating element via the heat transfer element. In one aspect, the sensor or probe monitors temperature and creates a feedback loop to control the transfer of thermal energy from a device located in the apparatus to the heating element via a heat transfer element. The apparatus, as one example of the implementation, also includes a bi-metal element to prevent overheating and controlling the among of heat transferring to the heating element. In one aspect, the apparatus is one of a stethoscope, a blood pressure monitor, and a thermometer. In another aspect, the stethoscope, blood pressure monitor and thermometer are configured as wireless devices and communicate data recorded using a wireless protocol.

In another embodiment, there is a method providing an embedded heating element to warm an exterior portion of the apparatus, wherein the heating element is heated using thermal energy generated by the apparatus. The method also includes providing a user temperature preference control to set a level of comfort at the exterior portion of the apparatus. In one aspect, the exterior portion of the apparatus is one of a sensor and probe. The method also includes providing a heat transfer element and a device to generate the thermal energy, wherein the thermal energy is transferred to the heating element via the heat transfer element. In one aspect, the sensor or probe monitors temperature and creates a feedback loop to control the transfer of thermal energy from a device located in the apparatus to the heating element via a heat transfer element. An example is to use a bi-metal element to controlling the among of heat transferring to the heating element. In one aspect, the apparatus is one of a stethoscope, a blood pressure monitor, and a thermometer. In another aspect, the stethoscope, blood pressure monitor and thermometer are configured as wireless devices and communicate data recorded using a wireless protocol.

Medical peripherals/sensors/probes often will make contact with the patients. The surface temperature of the peripherals/sensors/probes is usually much colder than the patient's body temperature. When the peripherals/sensors/probes contact the patient, the temperature difference will bring discomfort to the patients. Example: the ultra sound probe, the stethoscope, temp gauge, etc.

This invention discloses the use of system thermal energy generated by equipment, such as an ultrasound sensing device, to transfer to the peripherals/sensors/probes under user control. This will eliminate the "chill effect" perceived by the patient when he or she comes into contact with the instrument.

In addition, the invention allows the user to select, for example, temperature preference and control, which selection can be indicated by an LED indicator, or by some other user interface implementation, such as the LCD display using the touch screen as the control interface. For example, an LED when Green means comfort, Red means hot, and Blue means cool).

Preferably, the peripheral device (which may also be wireless) is a stethoscope, a blood pressure monitor, or a thermometer. Preferably, the peripheral device is configured to use the Bluetooth wireless communications protocol. The device could further comprise a docking station configured to receive and communicate with the chassis. Preferably, the docking station comprises at least one I/O port configured to connect a peripheral device. Preferably, a chassis of the device comprises a polymeric material. Preferably, the chassis further comprises a heat conductive material configured to dissipate heat generated within the chassis. Preferably, the heat conductive material comprises magnesium. Preferably, the motherboard is in communication with at least one RFID reader. In one variation, the motherboard is in communication with at least one digital camera. Furthermore, the device could comprise a polycarbonate chassis having a front side with a display screen. Preferably, the display screen is an LCD or a TFT display. Preferably, the LCD has a resolution of at least 640 pixels by 480 pixels and the LCD is configured to display a pixel bit-depth of not less than 8 bits. Preferably, the chassis comprises multiple parts forming seams that are gasketed to inhibit substantial penetration of liquid through the seams. The device could further comprise at least one battery mounted within the chassis. In variation, the device of this invention could have a warm swappable battery (battery can be changed out for a fresh one when system is docked).

FIG. 1 illustrates, among other things, a system thermal energy re-use methodology to eliminate the "chill effect" experienced by the patient when an instrument probe (e.g. stethoscope) touches his/her body. For example, the exemplary system has a "dock bay" for storing the stethoscope. Most stethoscopes have a metal surface to facilitate the transmission of patient's body noise to the ear piece, or in the case with an electronic stethoscope; a microphone will be used to capture the sound. This invention also contemplates a stethoscope designed to have a Bluetooth™ interface to allow captured and digitized sound to be transmitted to a host. This application can apply to, but is not limited to attached peripherals or remote peripherals. Although a stethoscope is used in the exemplary embodiment, it is equally understood that any medical device, sensor, peripheral, etc. could have an embedded heat element with control to work in this manner.

Figure 1B:
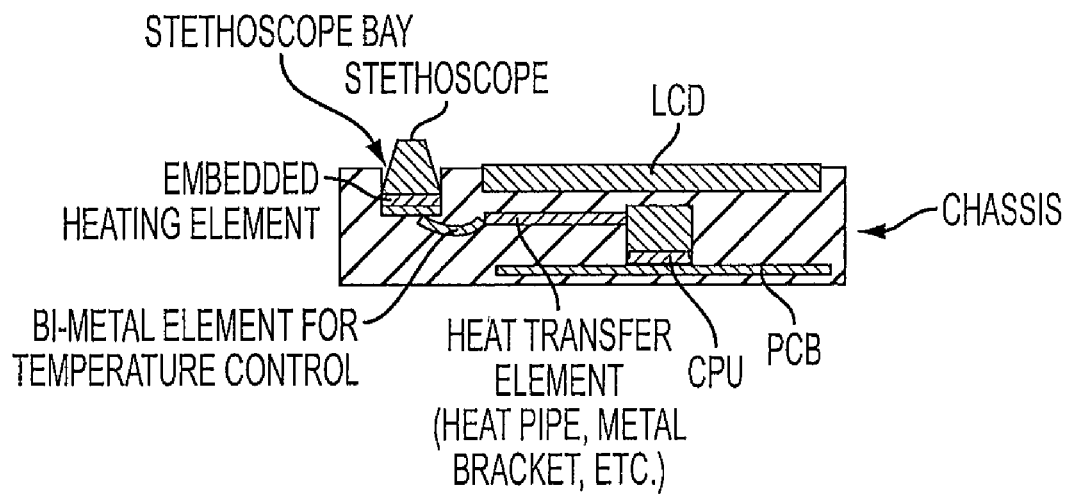

Referring to FIG. 1A and FIG. 1B, the stethoscope bay is designed to allow heat transfer from the system be conducted to the base of the stethoscope bay. The heat generated by the Central Processor (CPU), chipset, graphics controller are captured by a thermal transfer plate, or heat pipes that is in direct contact with these components. This thermal energy is transferred to the stethoscope bay or dock. A temperature sensor can be used to monitor the temperature of the stethoscope bay and create a feedback loop to control the transfer of heat (from the CPU or other heating element), and maintain the "bay" at the body temperature. The temperature sensor translated the heat level at the stethoscope bay into electrical information, a SMBus may be used for transferring such information to the CPU, which handles the user interface and controls the transfer of thermal energy from the components to the stethoscope bay. The stethoscope bay can also incorporate a heating element to allow a quick temperature ramp in case the system is just booted up, or just woke up from the sleep state. When the system has just awakened, the system basically is cool and will take a few minutes for the internal components to heat up. Meanwhile, the heating elements can immediately generate the required heat to warm up the stethoscope bay until the system component can generate the required heat to keep the bay warm. Alternatively, in continuous operation mode, the base of the stethoscope bay is kept warn by conducting heat from the heat generator of the system, such as the CPU and chipset. A Bi-metal arrangement is one implementation that can be used to control the heat flow from the heat source to the base plate of the stethoscope bay and maintain the bay at the required temperature.

While the system is in operation, the heat generated from the CPU is re-used for heating up the stethoscope bay, and no battery power is needed. Hence, heating operation will not impact the system's battery life.

Temperature comfort preference and control can be set by the patient to provide the maximum user friendliness. This feature allows the patient to have the probe at slightly different temperature level according to the preference of the patient.

The invention has at least the following advantages:
No need to drain the battery power to keep the instrument probe warm—no impact to system's battery life.
Provide comfort to the patient during medical examination.
Temperature comfort level can be selected by the patient.
A secondary heating provision to ramp up the temperature of the probe when the system is booted or just awaken from a sleep state.
The re-use of the system thermal to keep the instrument probe warm.

Peripherals: A peripheral is a type of computer hardware that is added to a host computer in order to expand its abilities. More specifically, the term is used to describe those devices that are optional in nature, as opposed to hardware that is either demanded or always required in principle. In some devices with a pre-determined set of functions for a platform which included stethoscope, then the stethoscope is not an optional peripheral. The term also tends to be applied to devices that are hooked up externally, typically through some form of computer bus like USB. Typical examples include joysticks, printers and scanners. Devices such as monitors and disk drives are not considered peripherals when they are not truly optional, and video capture cards are typically not referred to as peripheral because they are internal devices.

IA technology: Intel architecture (often abbreviated "I.A.") is the core technology created by Intel Corp.

Medical equipment: Medical equipment is machinery designed to aid in the diagnosis or treatment of medical problems. It is usually designed with rigorous safety standards. There are several basic types: Diagnostic equipment includes medical imaging machines are used to aid diagnosis. These include ultrasound, MRI, CAT-scans, PET, and x-ray machines; Therapeutic equipment includes infusion pumps, medical lasers and LASIK surgical machines; Life support equipment is used maintain a patient's bodily function. These include medical ventilators, heart-lung machines, ECMO, and dialysis machines; Medical monitors allow medical staff to measure a patient's medical state. Monitors may measure patient vital signs and other parameters including ECG, EEG, blood pressure, and dissolved gases in the blood; and Medical laboratory equipment automates or help analyze blood, urine and genes.

It is readily understood by the skilled artisan that the embodiments disclosed herein are merely exemplary and are not intended to limit the scope of the invention.

The invention claimed is:

1. An apparatus comprising:
   an electronic component selected from a CPU, a chipset, and a graphic controller;
   a housing including an exterior portion, the housing arranged to be coupled to a medical peripheral device;
   a heat-conducting element arranged within the housing and configured to warm the exterior portion of the housing, wherein the heat-conducting element is arranged to receive thermal energy generated by the electronic component;
   a user temperature preference control arranged to control an amount of thermal energy transmitted to the heat-conducting element; and
   a thermal sensor arranged to monitor temperature and create a feedback loop to control the transfer of thermal energy to the heat-conducting element via a heat transfer element.

2. The apparatus of claim 1, wherein the user temperature preference control is arranged to set a level of comfort at the exterior portion of the housing.

3. The apparatus of claim 1, wherein the medical peripheral device is selected from the group consisting of: a sensor and a probe.

4. The apparatus of claim 1, further comprising a heat transfer element, wherein the thermal energy is transferred to the heat-conducting element via the heat transfer element.

5. The apparatus of claim 1, wherein the thermal sensor is arranged in a peripheral receptacle that is arranged to receive the medical peripheral device.

6. The apparatus of claim 1, further comprising a bi-metal element to control the flow of the thermal energy and transferred to a peripheral receptacle that is arranged to receive the peripheral device.

7. The apparatus of claim 1, wherein the apparatus includes a medical device selected from the group consisting of: a stethoscope, a blood pressure monitor, ultrasound transceiver, a device that touches the skin of a patient, and combinations thereof.

8. The apparatus of claim 7, wherein the medical device is configured as a wireless device that is arranged to communicate data recorded using a wireless protocol.

9. The apparatus of claim 1 comprising a heating element arranged to warm up the housing before the electronic component is able to generate sufficient heat to keep the housing warm.

10. A method comprising:
    providing an electronic component within a housing of an apparatus, the electronic component being selected from a CPU, a chipset, and a graphic controller;
    providing a heat-conducting element within the housing of the apparatus and arranged to warm an exterior portion of the housing, wherein the heat-conducting element is arranged to receive thermal energy generated by the electronic component;
    providing a medical peripheral device coupled to the exterior portion of the housing; and
    controlling an amount of thermal energy transmitted to the heat-conducting element;
    wherein the medical peripheral device is arranged to monitor temperature and create a feedback loop to control the transfer of thermal energy to the heat-conducting element via a heat transfer element.

11. The method of claim 10, further comprising providing a user temperature preference control to set a level of comfort at the exterior portion of the housing.

12. The method of claim 10, wherein the medical peripheral device is selected from the group consisting of: a sensor, a probe, an ultrasound transceiver, a device that touches the skin of a patient, and combinations thereof.

13. The method of claim 10, further comprising providing a heat transfer element, wherein the thermal energy is transferred to the heat-conducting element via the heat transfer element.

14. The method of claim 10, wherein the medical peripheral device is arranged to monitor temperature and create a feedback loop to control the transfer of thermal energy from a device located in the housing to the heat-conducting element via a heat transfer element.

15. The method of claim 10, further comprising providing a bi-metal element to prevent overheating of the heat-conducting element.

16. The method of claim 10, wherein the apparatus includes one or more medical devices selected from the group consisting of: a stethoscope, a blood pressure monitor, an ultrasound transceiver, a device that will be in contact with the skin of a patient or person, and combinations thereof.

17. The method of claim 16, wherein the one or more medical devices are configured as wireless devices and communicate data recorded using a wireless protocol.

* * * * *